Oct. 7, 1924.

H. H. MARKER 1,510,690

DRIVING AND STEERING MECHANISM FOR VEHICLE WHEELS

Filed Jan. 20, 1921   3 Sheets-Sheet 1

Inventor
Henry H. Marker
By Attilio Buek
Attorney

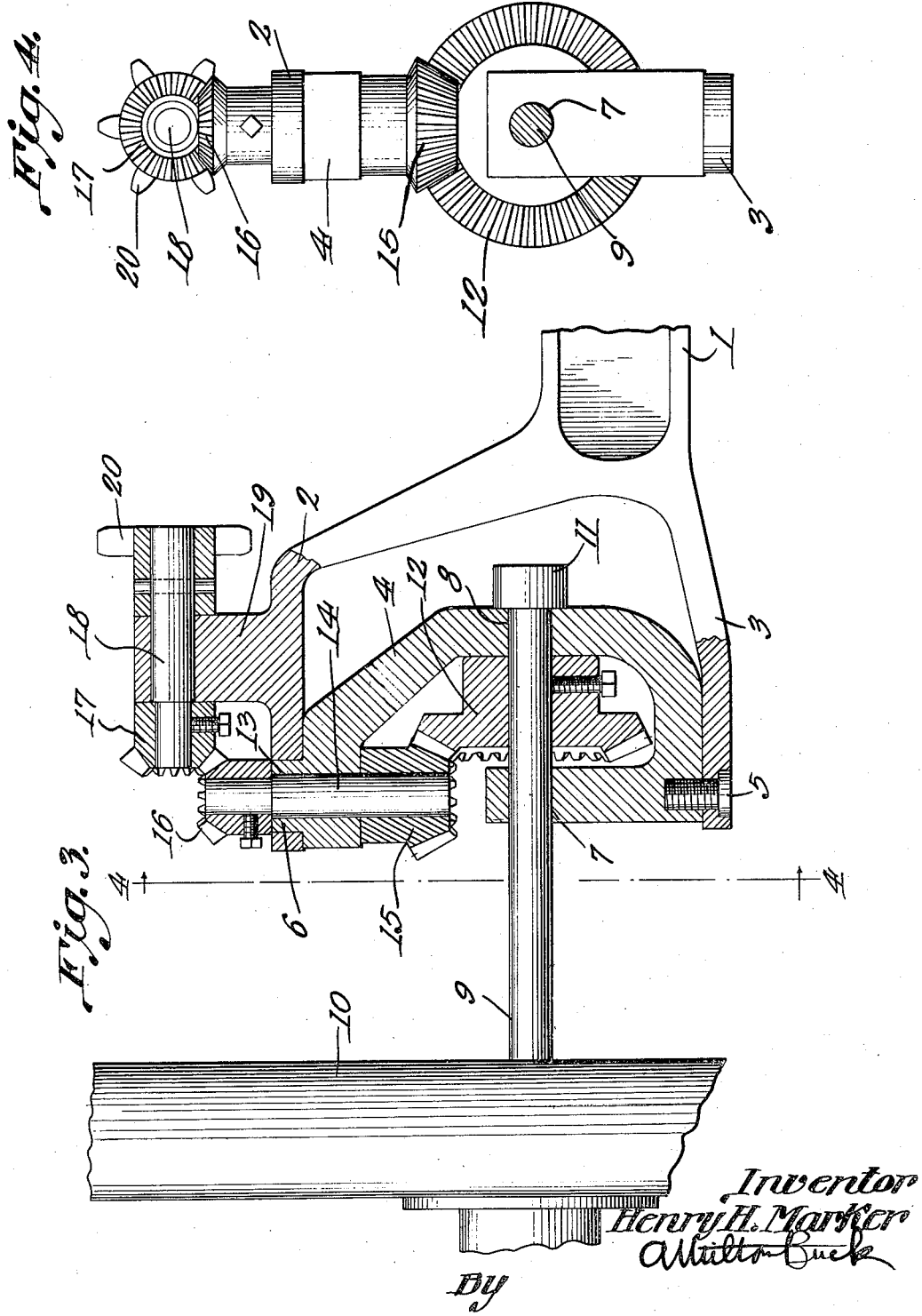

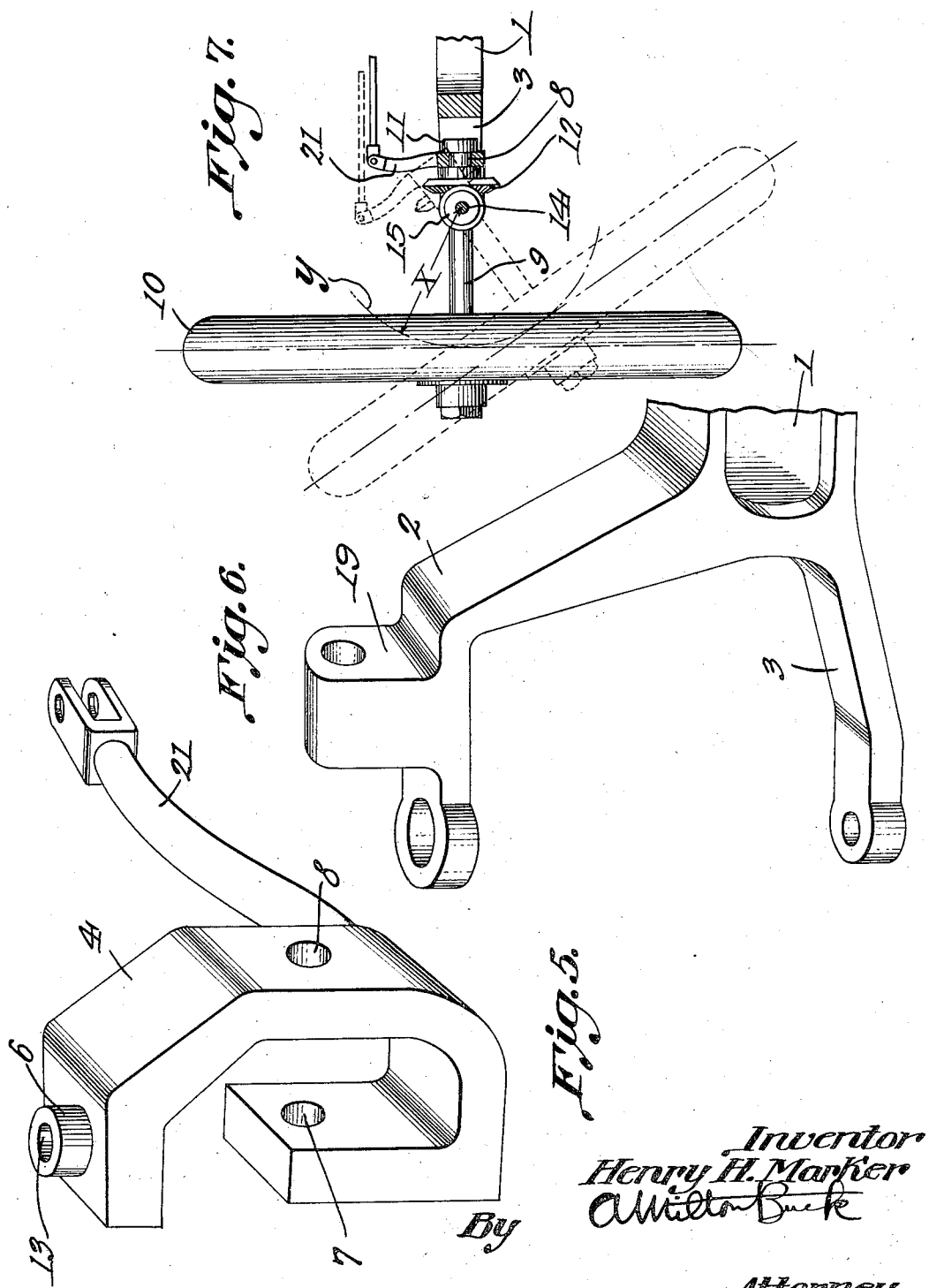

Patented Oct. 7, 1924.

1,510,690

UNITED STATES PATENT OFFICE.

HENRY H. MARKER, OF CLEVELAND, OHIO.

DRIVING AND STEERING MECHANISM FOR VEHICLE WHEELS.

Application filed January 20, 1921. Serial No. 438,603.

*To all whom it may concern:*

Be it known that I, HENRY H. MARKER, a citizen of the United States, residing at Cleveland, in the county of Cuyahoga and State of Ohio, have invented certain new and useful Improvements in Driving and Steering Mechanism for Vehicle Wheels, of which the following is a specification.

My invention relates to improvements in driving mechanism for vehicle steering wheels, and more particularly to that class or type in which driving or tractive power is applied to the pivoted or steering wheels of a vehicle without the use of differential gearing.

The primary object of the invention is to provide a generally improved driving and steering mechanism of the class indicated which will be exceedingly simple in construction, cheap of manufacture and efficient in use.

A further and important object is the provision of improved steering wheel knuckle and driving mechanism adapted to distribute and equalize the varying driving and pivoting stresses to meet the varying demands of actual service.

There are other features of the invention resulting in elemental combinations and particular construction of parts, all as will hereinafter more fully appear.

With the above mentioned and other ends in view, the invention consists in the novel construction, arrangement and combination of parts, hereinafter described, illustrated in some of its embodiments in the accompanying drawings, and particularly pointed out in the appended claims.

Figure 1:
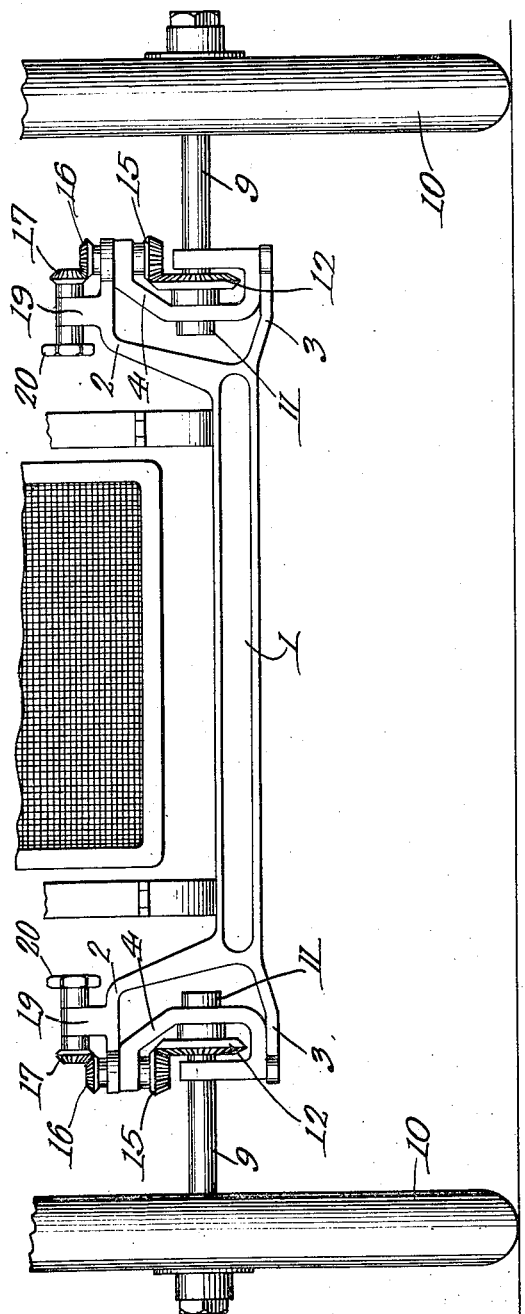

Referring to the drawings, forming a part of this specification, Figure 1 is a front elevation of a vehicle equipped with steering wheel mounting and driving mechanism constructed in accordance with this invention.

Figure 2:
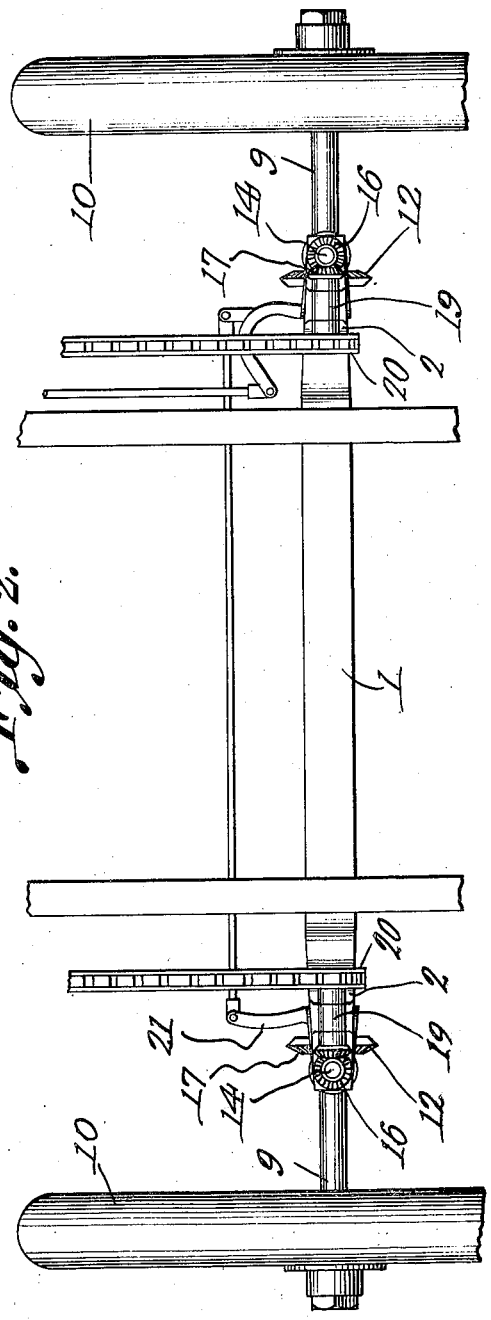

Fig. 2, a fragmentary top plan view of the same.

Fig. 3, an enlarged front elevation, partly in central vertical section, of the steering wheel knuckle and wheel driving mechanism.

Fig. 4, a side elevation, partly in section, taken on line 4—4 of Fig. 3.

Fig. 5, a perspective view of one of the steering knuckles, detached.

Fig. 6, a perspective view of the forked or knuckle receiving and carrying bearing arms of the axle, the steering knuckle being removed for the purpose of clearer illustration of the parts.

Fig. 7, a top plan view, partly in horizontal section, of one of the steering wheels and knuckles, the dotted lines illustrating the relative position of the parts when the steering wheel and steering wheel driving spindle are swung to an extreme position.

Similar numerals of reference designate like parts throughout all the figures of the drawings.

The axle 1, to which the steering wheel and steering wheel driving mechanism may be attached, may be of any suitable and convenient construction. In the present instance I have shown my improvement applied to the front axle and, if desired, such axle may terminate at its ends in the usual steering knuckle receiving and bearing arms 2 and 3. The steering knuckle 4, may likewise be of any suitable and convenient construction and, in the present instance, comprises a vertically pivoted member adapted to swing about a vertical axis through the medium of a pivot element or bolt 5, in the lower arm 3, and a bearing element or portion 6, (see Fig. 5) in the present instance in the specific form of a boss seated in and extending through a suitable bearing opening in the upper arm 2.

The steering knckle 4 is preferably provided with spaced vertically extending portions provided with bearing openings 7 and 8, adapted to removably receive and contain a steering wheel driving spindle 9.

The pivoted or steering wheel 10 may be of any suitable and convenient construction and may be provided with a tire of any suitable and convenient form or type.

If desired, the steering wheel driving spindle or shaft 9 may be provided at its inner end with a suitable thrust receiving bearing head 11, and as a means of driving the shaft or spindle 9, the latter may be provided with a gear 12, secured upon the shaft 9 in any suitable and convenient manner, as for example, by means of a set screw, as shown. The gear 12, in the present instance, is in the specific form of a bevel gear and the latter is adapted to receive motion through a second driving spindle or shaft 14, mounted in a concentric bearing opening 13, in the boss 6 and upper arm of the steering knuckle so that the shaft 14 will always extend axially in the same axial plane with the common axis of the bearing elements 5 and 6 as the steering knuckle is moved or swivelled. The vertically disposed shaft 14, is provided with a second bevel gear 15, meshing with the gear 12 and, as a convenient means of transmitting power to the shaft or spindle 14, the latter is provided at its top with a gear 16, the latter meshing with a gear 17 on the end of a horizontally disposed shaft 18. The shaft 18 is mounted in a suitable bearing head or bracket 19 and, in the presenst instance, the shaft 18 is provided with a sprocket wheel 20. In the present instance, the sprocket wheel 20 may be driven by a sprocket chain (see Fig. 2) leading to suitable driving mechanism of a suitable motor or prime mover. Each knuckle 4 is provided with a steering arm 21, adapted to be connected by suitable tie link or drag bar and connected to suitable steering mechanism.

In order that the steering wheel driving spindle or shaft 9 and the gear 12 attached thereto may be pivoted or swivelled freely without interfering in any way with the driving mechanism and whereby such driving mechanism will operate equally effective in the variable positions of the steering wheels 10 and driving shafts or spindles 9, I have discovered that the common longitudinal plane of the wheel 10 must be located at a relatively fixed or predetermined distance from the axis of movement of the knuckle 4 as determined by the bearing elements 5 and 6 and the shaft 14 and the ratio between the gears 12 and 15 and the radius of the wheel 10. In the present instance the gears 15 and 12 are in a two to one ratio and hence the distance of the longitudinal center of the wheel (the dotted line in Fig. 7) should correspond to the quotient obtained by dividing the radial distance of the wheel,— that is from the axial center to the outer periphery or tread surface,—by two,—the ratio existing between the gears 12 and 15. It will be understood therefore that the distance between the longitudinal central plane of the wheel 10 and the axis of movement of the steering knuckle 4, as indicated by the line X in Fig. 7, corresponds to one-half the radial distance between the center of the wheel and the outer periphery or tread thereof and that the center of the wheel when swung through the knuckle 4 and the steering mechanism traverses the arc of a circle, as indicated by Y in said Fig. 7 of the drawings.

Having thus described some of the embodiments of my invention, without having attempted to set forth all the forms in which it may be made, or all the modes of its use, what I claim and desire to secure by Letters Patent is,—

1. In a wheel driving and steering device, an axle, a steering knuckle thereon, a steering wheel, a steering wheel driving shaft carried by said knuckle and provided with a gear on the side of the axis of said steering knuckle diametrically opposite said steering wheel, a second gear meshing with the latter, a driving shaft mounted in the upper portion of said knuckle concentric with the axis thereof and connected to said second gear, and means for driving said steering wheel in the variable positions of the latter as moved by said steering knuckle, said means including a ratio between said first and second gears equal to the ratio of the radius of said steering wheel to the distance of the plane of the latter to the common axis of said steering knuckle and steering wheel driving shaft.

2. In a steering and driving device for vehicle wheels, an axle provided with upper and lower bearing arms, a steering knuckle vertically pivoted between said arms and provided with a bearing portion in said upper arm member, a steering wheel, a steering wheel driving spindle journaled in said steering knuckle and provided with a gear at the inner side of the axis of said knuckle, a second driving spindle in said steering knuckle mounted concentric with the axis of the latter and provided with a second gear meshing with said first mentioned gear, and means for driving said second spindle and gear in the variable positions of said steering wheel driving spindle and gear, said means including gears on said driving spindles whose ratio to each other equals the ratio between the radius of the steering wheel to the distance between the longitudinal plane of the latter and the axis of said steering knuckle.

3. In a front wheel driving and steering device, a front axle having knuckle receiving forked carrying arms, a steering knuckle swivelled in said arms and having spaced bearing members provided with spindle receiving bearing openings, one of said bearing members normally extending on the inner side of said swivelled connection, a steering wheel, a steering wheel driving shaft mounted in said bearing openings of said spaced bearing members of said steering knuckle and provided with a gear arranged between said bearing members to normally extend at the inner side of said knuckle swivel connections, a second driving spindle concentric with the axis of said steering knuckle and provided with a gear having a ratio of one to two to said first mentioned gear, said wheel having a radius equal to twice the distance between the longitudinal center of said wheel and the axis of movement of said knuckle.

4. In a driving mechanism for vehicle steering wheels, an axle provided with forked knuckle receiving steering arms, a steering knuckle vertically pivoted therein including separate concentrically arranged bearing elements forming the axis of movement of said steering knuckle, a steering wheel driving spindle carried by said steering knuckle, a gear on said steering wheel driving spindle carried by said steering knuckle at one side of the axis of movement of the latter and at a point axially opposite said steering wheel, a second driving spindle concentric with the bearing elements of said steering knuckle and concentric with the axis of movement of the latter, a gear on said second driving spindle meshing with said gear of said wheel driving spindle, and means for driving said second spindle, the common plane of said steering wheel being located at a distance from said axis of said steering knuckle corresponding to the radius of said steering wheel divided by the ratio between the gears carried by said driving spindles.

5. In a device of the character described, an axle, a steering knuckle thereon, a steering wheel, a steering wheel driving spindle carried by said knuckle and provided with a gear offset to the side of the axis of said steering knuckle diametrically opposite said steering wheel, a second gear meshing with said wheel driving spindle gear, and a second driving spindle mounted in the upper portion of said knuckle concentric with the axis thereof, the ratio of said gears on said driving spindles being equal to the ratio of the radius of said steering gear to the distance of the longitudinal center of the latter from the axis of said second driving spindle.

In testimony whereof, I, affix my signature.

HENRY H. MARKER.